United States Patent [19]

Schroeder

[11] Patent Number: 4,825,261
[45] Date of Patent: Apr. 25, 1989

[54] METHOD FOR READING OUT ROTATION RATE WITH A PASSIVE OPTICAL RESONATOR

[75] Inventor: Werner Schroeder, Umkirch, Fed. Rep. of Germany

[73] Assignee: LITEF GmbH, Freiburg im Breisgau, Fed. Rep. of Germany

[21] Appl. No.: 78,570

[22] Filed: Jul. 28, 1987

[30] Foreign Application Priority Data

Jul. 29, 1986 [EP] European Pat. Off. ......... 86 110 428

[51] Int. Cl.$^4$ ................................................ G01B 9/02
[52] U.S. Cl. ..................................................... 356/350
[58] Field of Search ......................................... 356/350

[56] References Cited

U.S. PATENT DOCUMENTS 4,323,310 4/1982 Shaw et al. ...................... 356/350
4,673,293 6/1987 Sanders ............................ 356/350

FOREIGN PATENT DOCUMENTS 0074609 3/1983 European Pat. Off. .
0172391 2/1986 European Pat. Off. .

OTHER PUBLICATIONS

"Passive Fiber-Optic Ring Resonator for Rotation Sensing", Meyer et al., *Optical Society of Americ,* 12-1983, pp. 644-646.

Primary Examiner—Vincent P. McGraw
Assistant Examiner—S. A. Turner
Attorney, Agent, or Firm—Elliott N. Kramsky

[57] ABSTRACT

A rotation rate readout method employing a passive optical resonator. The ring resonator is operated at approximate resonance in reflection and rotation rate-dependent phase shifts are detected, in particular as first harmonics, in the resonator. Two partial light beams are first frequency shifted by equal and opposite amounts, such frequency shift being modulated. Light components coupled out of the resonator pass through a mode filter in the opposite direction and are detected as an interference signal by an opto-electronic converter. The latter signal is demodulated with respect to the modulation frequency or its harmonics and the rotation rate signal obtained therefrom. Self-compensation of the optical and electronic readout systems may be attained by periodic brief and strong damping of the ring resonator. In contrast with known methods wherein two channels are separately processed and two mode filters required, the interference signal is processed in accordance with the invention requiring only a single mode filter.

14 Claims, 3 Drawing Sheets

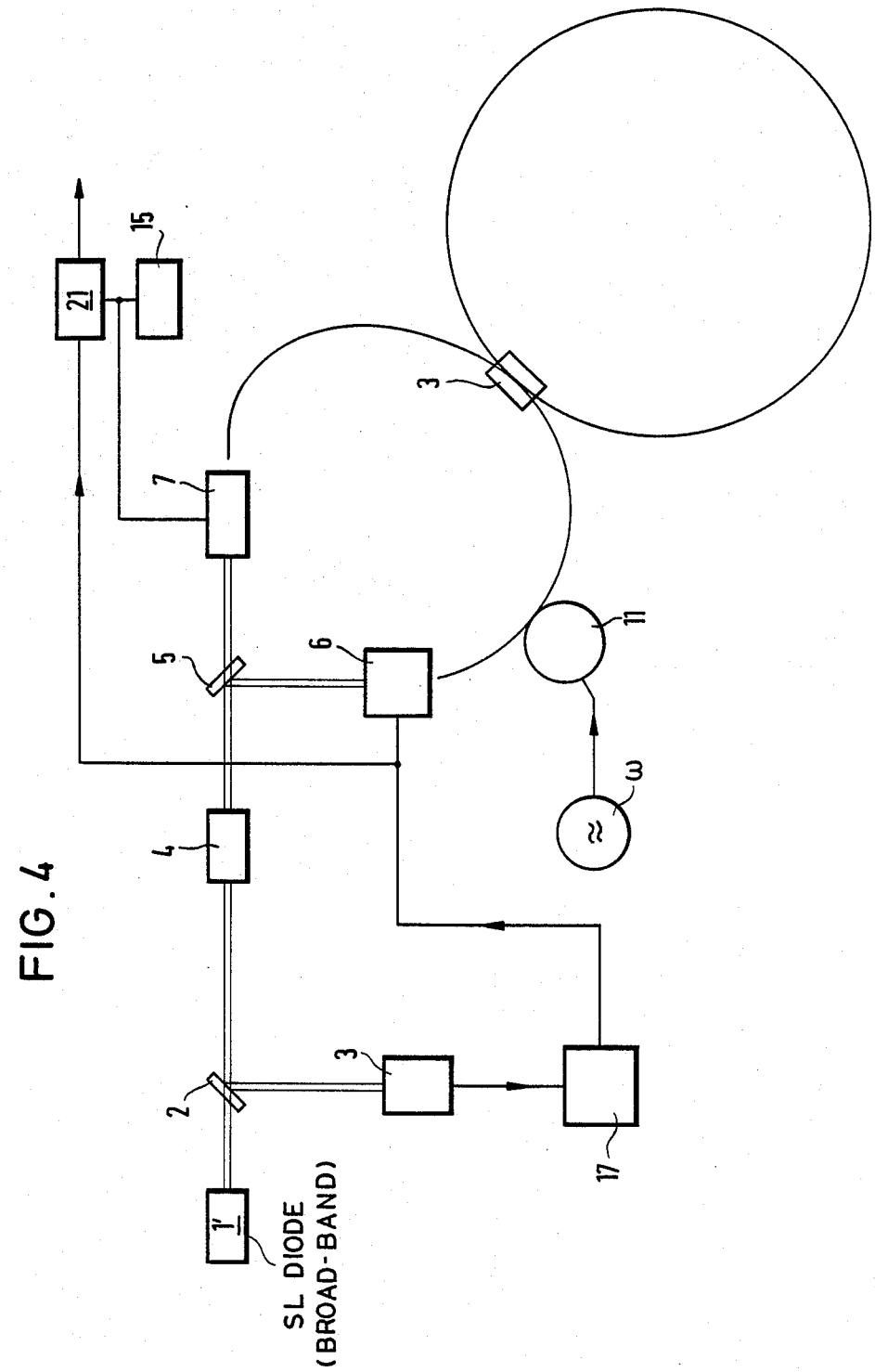

METHOD FOR READING OUT ROTATION RATE WITH A PASSIVE OPTICAL RESONATOR

BACKGROUND

1. Field of the Invention

The invention relates to a method for readout of rotation rate with a passive optical ring resonator of the type in which light from a tuned coherent light source passes through a mode filter, then is split into two partial light beams radiated in opposite directions into a ring resonator, and in which the light components of both directions of circulation are then coupled out.

2. Description of the Prior Art

In addition to the active resonator (laser gyro) and the Sagnac interferometer, the passive resonator is a suitable optical means for measuring rotation rate by the Sagnac effect (G. Sagnac: C. R. Acad. Sci. Paris 95, 708 (1913)).

Approximately 10 years ago, S. Ezekiel and S. R. Balsamo investigated the passive ring resonator at the Massachusetts Institute of Technology for suitability as a rotation rate sensor. An initial fundamental technical solution is disclosed in U.S. patent Ser. No. 4,135,822. Initial experimental results were published a short time later (*Appl. Phys. Lett.*, Vol. 30, p. 478 (1977)). Constant further development of the experimental model then led to a rotation sensor having inertial accuracy under laboratory conditions (*Opt. Lett*, Vol. 6, p. 569 (1981)).

Although the resonators in accordance with the experimental models were constructed using reflector technology, the possibility of a fiber resonator was considered at an early stage. See, for example, U.S. patent Ser. No. 4,135,822. However, an early fiber construction encountered technical problems. With the addition of a commercial coupler of high quality, however, it became possible to construct a resonator that allowed successful measurements to be carried out (R. E. Meyer et al., "Passive Fiberoptic Ring Resonator for Rotation Sensing", Preprint, MIT (1983)).

Parallel research efforts in the United States, particularly that of the E. L. Ginzton Laboratory at Stanford University, led to the development of a low-loss fiber directional coupler (*Electron. Lett.*, Vol. 16, p. 260 (1980)). By employing such couplers, it became possible to produce resonators having a fineness of 60 to 90 (cf. L. F. Stokes et al., *Opt. Lett.*, Vol. 7, p. 188 (1982)). Recently, a fiber ring resonator of fineness exceeding 600 was reported (M. Kemmler, K. Kempf, W. Schroder, *Technical Digest, Optical Fiber Sensors*, p. 85, San Diego). Experimental investigations into suitability as a rotation sensor were reported (cf. G L. Report No. 3620, E. L. Ginzton Lab, Stanford University, September 1983).

The development of passive resonators in integrated optics has also become known. See, for example, U.S. patent Ser. No. 4,326,803 and the Northrop company publication by A. Lawrence, "The MicroOptical Gyro", Northrop Precision Products Division, August 1983).

A resonator constructed of reflector technology has the disadvantage for a rotation rate sensor that the strict maintenance of the axial TEMoo mode in the resonator is difficult under unfavorable environmental conditions. A fiber resonator construction, to the contrary, has the advantage of a lesser temperature gradient sensitivity in comparison to a Sagnac interferometer due to the substantially shorter fiber length required (cf. D. M. Shupea, *Appl. Opt.* Vol. 20, p. 186 (1981)). However, a fiber ring can carry two polarization eigenstates. (cf. B. Lamouroux et al., *Opt. Lett.*, Vol. 7, p. 391 (1982)). The coupling of such states as a result of environmental influences can lead to null-point fluctuations in the output channel.

Additionally, only single-mode He-Ne lasers have been employed to date as light sources. The backscatter occurring in the fiber resonator is a substantial cause of interferences that disturb the useful signal. Application of one or more longer-wave-length coherent light sources theoretically provides improvement as the Rayleigh scattering is inversely proportional to the fourth power of the wavelength of the light. However, to date the obvious application of a longer-wavelength semiconductor laser has foundered as its spectral width is excessive for a good fiber resonator. A significant reduction of the spectral width of a semiconductor laser may be achieved by application of an external resonator (see S. Saito and Y. Yamamoto, *Electr. Lett.*, Vol. 17, p. 325 (1981); M. W. Fleming and A. Mooradian, *IEEE J. Quant. Electr. QE*, Vol. 17, p. 44 (1981)). Such a light source can be attained by adding one or more dispersive elements, grating and/or mirrors to the semiconductor laser or by coating the semi-conductor laser in such a way that the quality of the optical resonator is increased. The construction of an external resonator of fiber technology has been proposed. *IEEE Transactions on Microwave Theory and Techniques*, MTT 30, No. 10, 1700 (1982)).

The problem of undesired low-frequency interferences in the useful signal due to the mixing of a signal wave with the backscattered component of the oppositely directed wave invariably occurs in circumstances in which the two oppositely directed light waves occupy the same longitudinal resonator mode. A known remedy is phase modulation in the arrival optical path to the resonator (Sanders et al., *Opt. Lett.*, Vol. 6, p. 569 (1981)).

A further possibility is the application of frequency-shifting elements such as Bragg cells. In such a way, the interference signal between forward-scattered and backscattered light appears outside the detection bandwidth.

All hitherto-known resonator readout methods have utilized only the intensity information of the ring resonator to evaluate the rate of rotation. In this regard, the following difficulty does, however, arise: the cross-coupling of the two polarization eigenstates of the ring resonator leads to instabilities of the null point of the gyro output signal. A reciprocal configuration must be selected to remedy this requiring the application of two mode filters (spatial filter and polarization together).

SUMMARY AND OBJECTS OF THE INVENTION

It is therefore an object of this invention to simplify extraction of the rotation rate signal during rotation rate readout with a passive optical resonator.

It is a further object of the invention to achieve the above object while improving the unambiguous determination of the rotation rate signal.

The present invention overcomes the shortcomings of the prior art and achieves the aforementioned and other objects by providing, in a first aspect, an improvement in the method for reading out rotation rate with a passive optical resonator in which light from a tuned light source passes through a mode filter, is split into two partial light beams that are radiated in opposite directions into the ring resonator and such component beams are coupled out and detected to obtain a rotation rate signal. The improvement includes the step of shifting both partial light beams in frequency by equal and opposite amounts both before entry into and after exit from the ring resonator operated in reflection. The frequency shift is modulated. The exiting partial beams interfere and are passed through the mode filter in opposite directions. The interference signal is detected by means of an opto-electronic converter and then the rotation rate signal is obtained by demodulating the interference signal with respect to the modulation frequency or its harmonics.

In a second aspect, the invention provides an alternative improved method for reading out rotation rate with a passive optical resonator... A broadband light source is employed as light source. Both partial light beams are shifted by equal and opposite frequency values before entry into and exit from the ring resonator operated in reflection. The frequency shift is modulated with respect to a radiated and a coupled-out component of the other light beam. The partial light beams of the light components coupled out are brought to interference passing through the mode filter in the opposite direction. The interference signal is detected by an opto-electronic converter and demodulated with respect to the modulation frequency or its harmonics. The rotation rate signal is then obtained from the demodulated interference signal.

The foregoing features and advantages of this invention will become further apparent from the detailed description of a presently preferred embodiment that follows. This written description is accompanied by a set of drawing figures. Numerals of the figures, corresponding to numerals of the written text, point to the features of this invention, like numerals referring to like features throughout.

BRIEF DESCRIPTION OF THE DRAWINGS

FIG. 4 is a schematic diagram of alternative apparatus for measuring rotation rate in accordance with the invention, such apparatus including a simplified construction with the application of a broadband light source such as a super-luminescence (SL) diode.

DETAILED DESCRIPTION

Figure 1A:
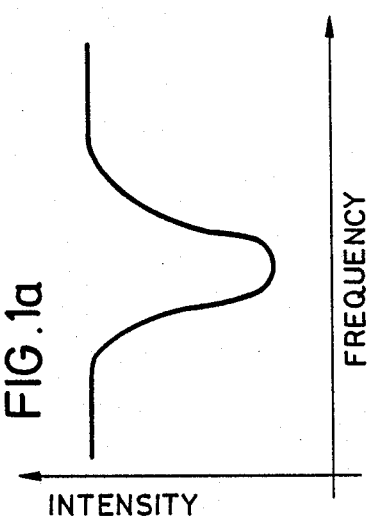
FIGS. 1a and 1b are graphical representations of the intensity signal at the exit of a ring resonator that is operated in reflection and the phase progression between the entrance and the exit of the resonator respectively.
Figure 1B:
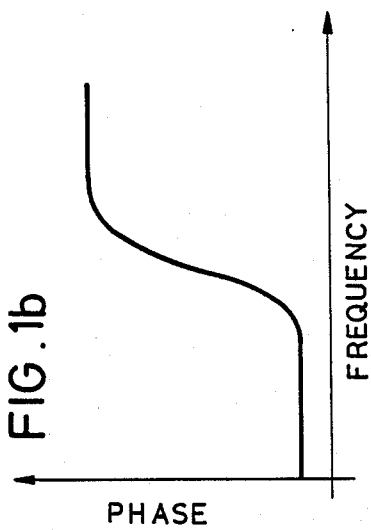

As mentioned above, in known resonator readout methods only the intensity information of the ring resonator is taken into consideration when evaluating rotation rate. However, a ring resonator operated in reflection also demonstrates a $2\pi$ phase jump of the intensity signal on passing through a resonance. FIG. 1a is a graphical representation of the intensity progression at the exit of a resonator operated in reflection, while FIG. 1b is a representation of the corresponding progression of phase between the resonator entrance and exit.

Figure 3:
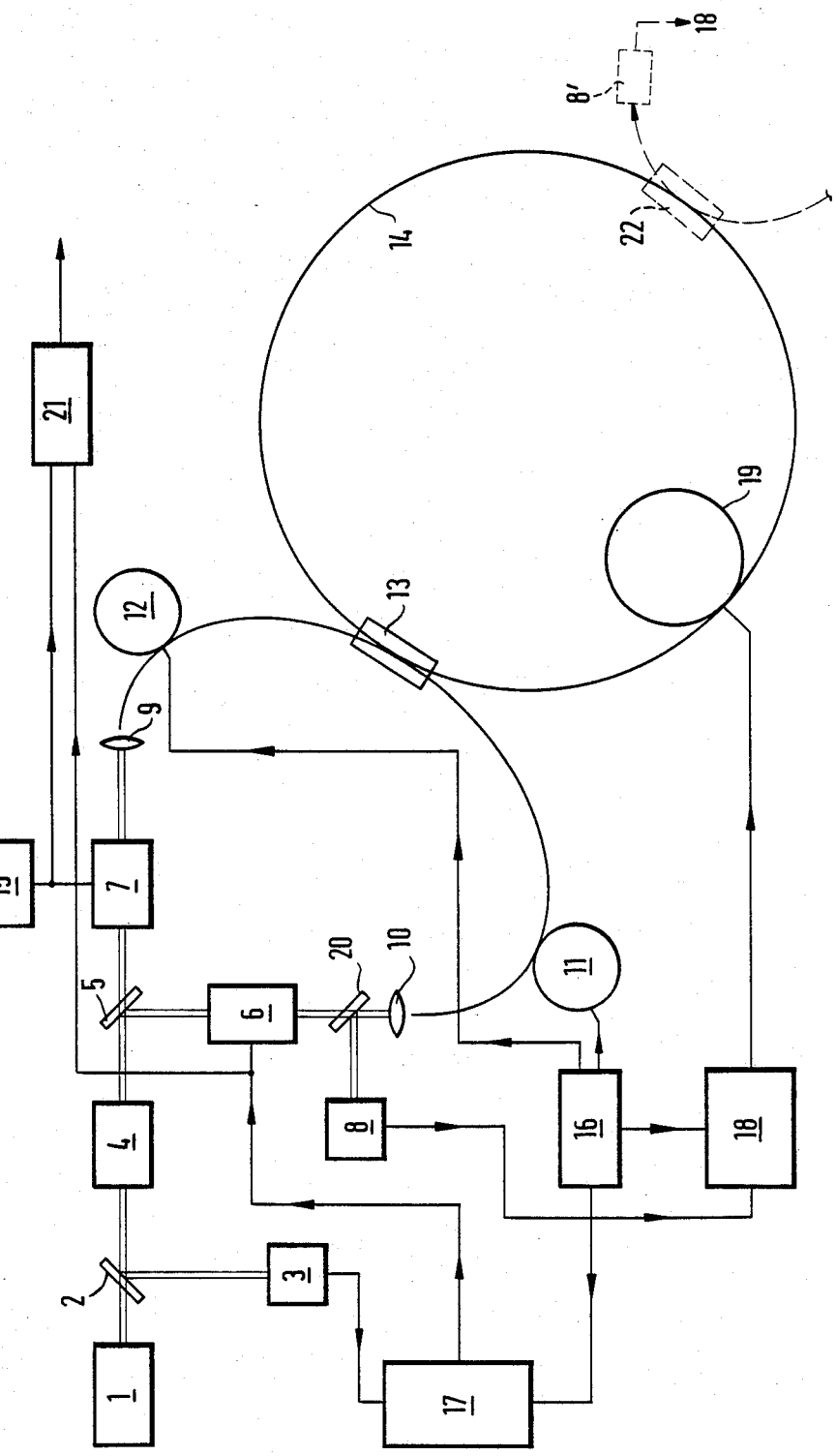
FIG. 3 is a schematic diagram of apparatus for measuring rotation rate in accordance with the method of the invention.

In the application of the method of the invention in a device for measurement of rotation rate of the type that exhibits a reciprocal configuration, an example of which is shown in FIG. 3, a particular advantage is derived from the fact that only one mode filter is required.

For the person skilled in the art, the additional intensity variation due to modulation of the frequency shift of the light reflected by the ring resonator has, in the first instance, a disturbing effect in the evaluation of the interference signal. However, in the instance of opposite frequency modulation of the partial light beams in accordance with the invention, it is evident that such disturbance is eliminated (i.e. compensated) and a rotation-rate-dependent, non-reciprocal phase shift occurs in the ring, particularly as the first harmonic in the detector signal.

Figure 2A:
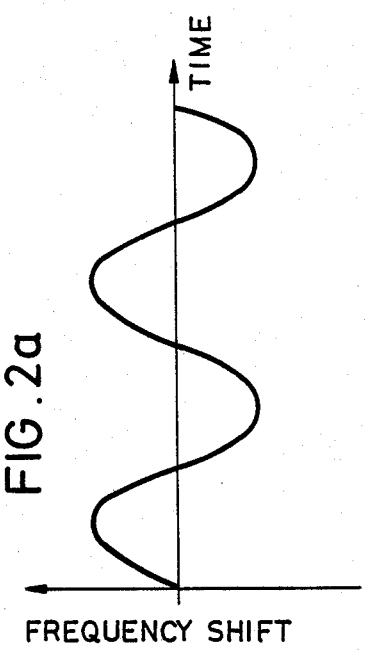
FIGS. 2a and 2b are graphs of the frequency shifts of the two (partial) light beams as functions of time.
Figure 2B:
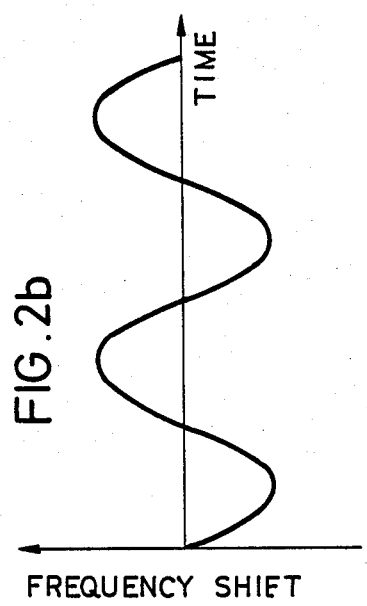

FIG. 2a is a graphical representation of the frequency shift of one of the partial light beams, and FIG. 2b that of the other, each as a function of time. The frequency shifts take place in antiphase and with approximately equal amplitudes.

In addition to direct evaluation, the rotation rate signal can also be employed, as is known to those skilled in the art, to reset the gyro. For example, the frequency of at least one partial light beam may be regulated by a Bragg cell.

FIG. 3 is a schematic diagram of apparatus for measuring rotation rate in accordance with the method of the invention. As shown, light from a coherent source 1 passes, after transmission through a first semi-transmitting mirror 2, through a mode selector 4, and is split into two partial light beams by a second semi-transmitting mirror 5. Bragg cells 6 and 7 shift the light in frequency in each instance by equal values. That is, the beams are shifted by the entrance high frequency of the Bragg cells. Lenses 9 and 10 radiate the partial light beams in opposite directions into a fiber ring resonator 14 via a coupler 13. The two partial light beams are further modulated by frequency modulators 11 and 12 in push-pull through a generator 16 to obtain, after interference, a modulated intensity signal in the readout channel that contains the rotation rate information.

The light reflected by the ring resonator 14 and coupled out at the coupler 13 passes through the frequency modulators 12 and 11 and the two Bragg cells 7 and 6 again and is recombined at the semi-transmitting mirror 5. Since the frequency modulators 11, 12 are driven out-of-phase, and the optical path is the same for both oppositely directed light components, no frequency difference exists between the two light components as a result of either the frequency modulation or the effects of the Bragg cells 6, 7.

If one partial light beam is considered, for example that passing through the Bragg cell 6, the following sequence is obtained: the light is first shifted in the Bragg cell 6 in the determined frequency square, then modulated in phase or shifted in frequency by the frequency modulator 11, passes through the resonator 14, then, likewise, frequency- or phase-shifted in the frequency modulator 12, then passes through the Bragg cell 7 and is shifted there again by a determined frequency amount in order, finally, to be recombined in the beam splitter 5 with the light that has passed through the ring resonator 14 in the opposite direction. The frequency modulators 11 and 12 are operated in push-pull, so that, at zero rotation rate, the frequency shift in the frequency modulator 11 is again cancelled by the frequency modulator 12 and vice versa.

The interfering light then again passes through the mode selector 4 and is directed at a first semi-transmitting mirror 2 to a light detector 3. The light detected by the detector 3 is demodulated in an electronic control system 17 and converted into a frequency signal for adjustment of the Bragg cell 6. In accordance with the preconditions, the Bragg cell 7 is acted upon with constant frequency. By regulation of the frequency of the Bragg cell 6, the shift of the resonance line of the ring resonator 14 resulting from the Sagnac effect on rotation of the resonator is compensated.

Furthermore, the reflected light from the ring resonator 14 passes, on the path via 11, to a third semi-transmitting mirror 20 and to another light detector 8. It is then demodulated and the resonance frequency of the ring resonator 14 is tuned to the light source 1 by means of an electronic control system 18.

The frequency output signals of the electronic control system 17 for adjusting the Bragg cell 6 and those of a frequency generator 15 pass to the input of an evaluation counter 21. The digital rate of rotation signal can be extracted at its output. The evaluation counter 21 counts the signals of the electronic control system 17 positively and those of the frequency generator 15 negatively.

Null point errors of the rotation rate measurement device of the invention are compensated as follows:

The application of the Bragg cells 6 and 7 in the phase measurement device leads, in general, to a null point error $\Delta\Phi$ of the phase difference at rotation rate 0 of $$\Delta\Phi = \frac{4\pi n \Delta f}{c} \cdot (L_1 - L_2),$$

where $L_1$ and $L_2$ designate the intervals of the frequency-shifting elements from the point of bifurcation at the semi-transmitting mirror 5, of the two oppositely directed light beams; $\Delta f$ designates the extent of the frequency shift; n designates the refractive index; and c designates the velocity of light.

In the course of a rotation rate measurement, the phase error $\Delta\Phi$ is interpreted as a rotation rate, and leads to a gyro null point error.

In order to distinguish the actual rotation rate from an erroneous rate generated by the measurement device, or to measure the null point of the gyro under rotation, the ring resonator 14 can be "deactuated" for a short period of time. For this purpose, the ring resonator 14 can either be strongly damped (e.g. by a high degree of bending of the fiber) or it and/or the light source 1 can be detuned relative to the other.

If, moreover, the supply fibers to the ring resonator 14 are laid in a bifilar configuration, the gyro becomes insensitive to rotations since the fibers, laid closely parallel with one another, do not include any surface and the ring resonator 14, because of a high degree of (deliberate) damping, no longer makes any substantial contribution. The remaining phase difference is the current null point error of the gyro, which can, for example, be compensated by means of a navigational computer.

Another possibility for "deactuating" the ring resonator at periodic intervals by a high degree of damping consists in the application of an initially polished coupler half, such as the so-called "Stanford coupler" that is coated with a material whose refractive index is of the order of magnitude of the refractive index of the fiber employed for the ring resonator 14. The coating material may be, for example, nematic crystals whose refractive index can be varied by application of electric fields. As long as the refractive index is set below the fiber refractive index (by variation of an applied voltage) it is possible that no loss will occur in the coupler half in the mode guided in the fiber. If, on the other hand, the refractive index is set somewhat above or equal to the refractive index of the fiber mode then the light is efficiently coupled out of the initially polished coupler half and circulation losses in the ring resonator increase to such a great extent that it is, for practical purposes, put out of operation.

Known methods may be utilized to measure such a phase difference determining the current null point error and are relied upon for accurate determination of phase difference by the Sagnac interferometer. Examples include phase demodulation with transit time difference, periodic switching over of the frequency of a Bragg modulator and the like. In the device of FIG. 3, the ring resonator 14, "deactuated" in the manner above explained, becomes a Sagnac interferometer that is insensitive to the rate of rotation. Such calibration can be undertaken repeatedly at short time intervals, even during rotation of the gyro. For example, this may occur by brief-period addition of a voltage to the signal from the length regulator 19 during brief-period interruption of the regulating loop so that the tuning of the ring resonator 14 and the light source 1 is removed in a defined manner. Null point compensation with the ring resonator 14 "deactuated" occurs automatically, initiated by a defined program step. The read-out null point or null point drift is then subtracted from the actual rate of rotation signal so that the accuracy of the entire rotation rate measuring device is continuously assured.

In compensating the rotation rate measuring device by intermittent "deactuation" of the ring resonator 14 as described above, it is necessary to operate the modulators 11, 12 at relatively high frequencies and/or with relatively high control amplitudes to obtain an efficient signal for the phase shift in the ring resonator (now regarded as a Sagnac interferometer) that is of the same order of magnitude as the rotation rate signal. Employing such a signal, comparable to the rotation rate signal, the optical (or electronic) readout system can be continuously set to a desired null point.

As compared with the utilization of the intensity signal in accordance with the prior practice, only a single mode filter is required. This results from the fact that the interference signal is processed by a single channel rather than the two separate channels employed for intensity comparison measurements. Mode filters of sufficiently good mode selection are both difficult to produce and expensive.

In the embodiment of FIG. 3, compensation of the ring resonator 14 to the light source 1 occurs by coupling-out through the semi-transmitting mirror 20 to the light detector 8 (whose output signal determines the setting of the length regulator 19) via the electronic control system 18. An alternative arrangement may be provided by locating a coupling-out location 22 in the ring itself, as shown in broken lines in FIG. 3. Light coupled out at this point acts on a light detector 8' whose output signal again tunes the ring resonator 14 to the narrowband light source 1 by means of the electronic control system 18. In this alternative case, one may dispense with the coupler or mirror 20. This solution provides structural advantages for a system in accordance with the invention when constructed in integrated optics.

FIG. 4 is a schematic diagram of alternative apparatus for measuring rotation rate. Such apparatus features a simplified construction in the case of application of a broadband light source 1' such as an SL diode. In such a situation, one can dispense with tuning the light source 1' and the ring resonator 14. Thus, in FIG. 4, the electronic control system 18 is eliminated along with the length regulator 19, the light detector 8 and the mirror 20. As is shown by the drawing, it is also possible to dispense with one of the phase modulators 11, 12. The resulting arrangement is then a Sagnac interferometer in which the usual coil is replaced by a ring resonator. In addition to a simplified construction, this embodiment provides the further advantage that no intensity variation can be observed at the exit of the resonator. Rather only pure phase shifts occur on varying the entrance phase. In the illustrated arrangement the ring resonator 14 is essentially employed solely as a transit time stretch, requiring substantially less fiber for the same phase sensitivity. A lower light intensity appears at the detector 3. However, as the arrangement is similar to a Sagnac interferometer, the noise components are considerably lower.

Thus it is seen that the present invention provides a simplified method for extraction of the rotation rate signal during rotation rate readout with a passive optical resonator. By employing such method an improved unambiguous determination of the rotation rate signal is obtained.

While this invention has been described with reference to the presently preferred embodiments, it is by no means limited thereto. Rather, the scope of this invention is limited only insofar as defined by the following set of claims and includes all equivalents thereof.

What is claimed is:

1. In a method for reading out rotation rate with a passive optical resonator in which light from a tuned coherent light source passes through a mode filter, is split into two partial light beams that are radiated in opposite directions into said ring resonator and said component beams are coupled out and detected to obtain a rotation rate signal, the improvement comprising the step of:
   (a) shifting both partial light beams in frequency by equal and opposite amounts both before entry into and after exit from said ring resonator operated in reflection; then
   (b) modulating said frequency shift; then
   (c) bringing said exiting partial light beams to interference by passing said beams through said mode filter in the opposite direction; then
   (d) detecting said interference signal by means of an opto-electronic converter; then
   (e) demodulating said interference signal with respect to the modulation frequency of its harmonics; and then
   (f) obtaining said rotation rate signal from said demodulated interference signal.

2. A method as defined in claim 1 further including the step of putting the ring resonator out of operation for a brief period at predetermined time intervals by detuning the ring resonator and/or the light source for self-compensation of the optical and electronic readout systems.

3. A method as defined in claim 1 further including the step of putting the ring resonator out of operation for a brief period by increasing losses in the ring resonator for self-compensation of the optical and electronic readout systems.

4. A method as defined in claim 3 wherein the step of putting the ring resonator out of operation further comprises the step of varying the modulation procedure from the measurement operation by forming a signal that is approximately of the order of magnitude of the rate of rotation measurement signal in terms of amplitude for null point compensation of the optical and electronic readout systems.

5. A method as defined in claim 1 wherein at least one of said two radiated light components is additionally frequency-shifted, said shift being determined by the signal obtained from the demodulation of the interference signal.

6. A method as defined in claim 5 wherein said additional frequency shift is generated by at least one Bragg cell.

7. A method as defined in claim 5 wherein said additional frequency shift is constant and effected by means of phase modulators in accordance with the serrodyne method.

8. A method as defined in claim 5 wherein the elements for effecting said additional frequency shift are constructed in integrated optics.

9. A method as defined in claim 5, characterized in that the difference frequency of said frequency-shifting means is employed for determining the rate of rotation.

10. A method as defined in claim 1 wherein said partial light beams are modulated by means of integrated optics.

11. A method as defined in claim 1 wherein polarizers are disposed as mode-selecting elements for increasing the null point stability of the ring resonator.

12. A method as defined in claim 1 including the step of measuring the transmitted and/or reflected intensity of said ring resonator at at least one position for tuning said ring resonator to said light source.

13. A method as defined in claim 12 further comprising the steps of:
   (a) providing a coupling-out location at said ring resonator;
   (b) passing the light coupled out at said location to a light-sensitive detector; and
   (c) switching said light for further processing to an electronic adjusting system for tuning said ring resonator to said narrowband light source.

14. A method for reading out rotation rate with a passive optical resonator in which light from a coherent light source passing through a mode filter is split into two partial light beams that are radiated in opposite directions into said ring resonator and said component beams are coupled out and detected to obtain a rotation rate signal, the improvement comprising the steps of:
   (a) employing a broadband light source as said light source;
   (b) shifting both partial light beams by equal and opposite frequency values before entry into and after exit from the ring resonator operated in reflection;
   (c) modulating said frequency shift with respect to a radiated and with respect to the coupled-out component of the other light beam;
   (d) bringing the partial light beams of the light components coupled out to interference by pasting them through the mode filter in the opposite direction;

(e) detecting said interference signal with an optoelectronic converter; then (d) demodulating said interference signal with respect to the modulation frequency or its harmonics; and then (g) obtaining the rotation rate signal from said demodulated interference signal.

* * * * *